US011162458B2

(12) United States Patent
Schacht (10) Patent No.: US 11,162,458 B2
(45) Date of Patent: Nov. 2, 2021

(54) VENTILATION AND EXTINGUISHING DEVICE FOR A GAS TURBINE ENGINE

(71) Applicant: Rolls-Royce Deutschland Ltd & Co KG, Blankenfelde-Mahlow (DE)

(72) Inventor: Michael Schacht, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 58 days.

(21) Appl. No.: 16/701,642

(22) Filed: Dec. 3, 2019

(65) Prior Publication Data

US 2020/0240361 A1 Jul. 30, 2020

(30) Foreign Application Priority Data

Dec. 18, 2018 (DE) .................... 10 2018 222 162.6

(51) Int. Cl.
*F02K 3/06* (2006.01)
*F02C 7/36* (2006.01)
(Continued)

(52) U.S. Cl.
CPC ............... *F02K 3/06* (2013.01); *F02C 7/36* (2013.01); *B64D 2045/009* (2013.01); *F02C 7/12* (2013.01); *F02C 7/25* (2013.01); *F05D 2220/323* (2013.01); *F05D 2220/36* (2013.01); *F05D 2260/40311* (2013.01); *F05D 2260/606* (2013.01)

(58) Field of Classification Search
CPC ..... F02C 7/25; F02C 7/12; F02C 7/36; B64D 2045/009; A62C 3/00; A62C 3/08
See application file for complete search history.

(56) References Cited

U.S. PATENT DOCUMENTS 4,163,366 A * 8/1979 Kent .................. F02C 7/25
60/226.1
4,304,093 A 12/1981 Schulze
(Continued)

FOREIGN PATENT DOCUMENTS

EP 2918787 A1 9/2015
EP 3087265 A1 11/2016

OTHER PUBLICATIONS

German Search Report dated Aug. 30, 2019 for counterpart German Patent Application No. 102018222162.6.

*Primary Examiner* — Steven M Sutherland
(74) *Attorney, Agent, or Firm* — Shuttleworth & Ingersoll, PLC; Timothy Klima (57) ABSTRACT

A ventilation device for controlling an air flow through at least one air inlet into an interior space of a gas turbine engine, comprises: at least one actuable closure device for the at least one air inlet, which has an open position for exposing the air inlet and can be transferred by actuation into a closed position for closing the air inlet; and a fire extinguishing device having an extinguishing agent arranged in a reservoir, wherein the fire extinguishing device is connected or can be connected to the interior space and the closure device in such a way that activation of the fire extinguishing device both leads to admission of extinguishing agent from the reservoir into the interior space and brings about actuation of the closure device to transfer the closure device into the closed position.

12 Claims, 5 Drawing Sheets

(51) Int. Cl.
*B64D 45/00* (2006.01)
*F02C 7/12* (2006.01)
*F02C 7/25* (2006.01)

(56) References Cited

U.S. PATENT DOCUMENTS

| | | |
|---|---|---|
| 4,351,394 A | 9/1982 | Enk |
| 4,441,314 A | 4/1984 | Fitton |
| 5,239,817 A | 8/1993 | Mildenstein et al. |
| 5,466,198 A * | 11/1995 | McKibbin ................. F02C 7/36 475/346 |
| 6,964,155 B2 * | 11/2005 | McCune ................... F02C 7/36 384/297 |
| 2014/0202718 A1 * | 7/2014 | Meis ........................ A62C 3/08 169/46 |
| 2016/0368618 A1 | 12/2016 | Charlemagne et al. |

* cited by examiner

VENTILATION AND EXTINGUISHING DEVICE FOR A GAS TURBINE ENGINE

This application claims priority to German Patent Application DE102018222162.6 filed Dec. 18, 2018, the entirety of which is incorporated by reference herein.

The present disclosure relates to a ventilation device for controlling an air flow through at least one air inlet into an interior space of a gas turbine engine as disclosed herein, to a casing assembly and to a gas turbine engine.

In typical gas turbine engines, various components are cooled by means of an air flow in order to prevent overheating and ensure a maximum possible life for the components. In various areas, it is furthermore often necessary to provide a fire extinguishing device if combustible vapors build up in these areas and possibly ignite. In the case of a fire, the fire extinguishing device is activated, with the result that extinguishing agent is directed into this area in order to extinguish the fire.

For cooling which is as efficient as possible, a powerful air flow is desirable. In order to extinguish a fire effectively with the extinguishing agent, however, it is generally necessary to introduce a quantity of extinguishing agent such that it reaches a certain concentration in the corresponding area. If the air is exchanged rapidly in an area in which a fire is supposed to be extinguished by means of the fire extinguishing device, it is accordingly generally necessary to introduce a correspondingly large quantity of extinguishing agent within a correspondingly short time. Powerful cooling can thus require relatively large extinguishing agent capacities, which can, in turn, result in increased weight.

One hitherto customary extinguishing agent is halon. Since it belongs to the group of chlorinated fluorocarbons, it should, however, be replaced by other extinguishing agents in aviation applications too. However, these generally require significantly higher concentrations in comparison with halon in order to reliably extinguish a fire. As a result, the problem of increased weight can be further exacerbated.

It is the object of the present invention to provide cooling and fire extinguishing in a manner which is as efficient as possible with a weight which is as low as possible and with a simple construction.

According to one aspect, a ventilation device for controlling an air flow through at least one air inlet into an interior space of a gas turbine engine is provided. The ventilation device comprises at least one actuable closure device for the at least one air inlet, wherein the closure device has an open position for exposing the air inlet and can be transferred by actuation of the closure device into a closed position for closing the air inlet. The ventilation device furthermore comprises a fire extinguishing device having extinguishing agent arranged in at least one reservoir. In this case, the fire extinguishing device is connected or can be connected to the interior space and to the closure device in such a way that activation of the fire extinguishing device both leads to admission of extinguishing agent from the reservoir (or the reservoirs) into the interior space and brings about actuation of the closure device for transfer thereof into the closed position.

As soon as a fire has to be extinguished, the air inlet is thus closed (e.g. airtightly or substantially airtightly) owing to the introduction of extinguishing agent, with the result that air in the interior space is not exchanged or is exchanged only to a reduced extent and the extinguishing agent is accumulated rapidly and can thus be used particularly efficiently. As a result, even small quantities of extinguishing agent are sufficient, and the reservoir can be of correspondingly small dimensions. As a consequence, a particularly low weight of the ventilation device (and of the aircraft having the ventilation device) can be achieved. At the same time, it is possible to embody air inlets and air outlets of the interior space with a relatively large cross section (and/or to provide a relatively large number of air inlets and/or air outlets) in order to exchange the air in the interior space at a high rate, e.g. more than 5 times per minute, in particular 6 times or more. This allows particularly efficient cooling, which in turn makes possible an increased life of the adjoining components. Moreover, more components to be cooled can be accommodated on or in the interior space and can furthermore be cooled in an effective manner.

Furthermore, the extinguishing agent itself is used to actuate the closure device. As a result, further actuators, control fluids or the like are not required. A particularly simple construction is thereby made possible, which furthermore has particularly few possible sources of faults.

According to one embodiment, the fire extinguishing device comprises at least one valve. The valve is designed to control the discharge of extinguishing agent from the reservoir. The valve can be controllable by a control signal, e.g. in the form of an electric control signal. The control signal provides the current required to control the valve, for example. Opening of the valve can have the effect that the extinguishing agent is let into the interior space and, at the same time, the air inlet is closed by the closure device.

The extinguishing agent can be a fluid (a liquid or a gas), which allows particularly simple handling. The fluid is optionally some other extinguishing agent than halon, i.e. not halon.

The ventilation device can furthermore comprise a line arrangement, via which the reservoir is in or can be brought into fluid connection with the interior space and the closure device.

The line arrangement can comprise at least one branch, in particular within the interior space.

As an option, the ventilation device comprises an actuator, which is connected to the line arrangement and is operatively connected to the closure device, wherein the actuator is designed to actuate the closure device for transfer into the closed position as a result of being supplied with extinguishing agent from the reservoir.

As an option, the closure device is preloaded into the open position. It is thereby possible to ensure that the air inlet is opened in the normal state without further measures being necessary.

According to a development, a spring is provided for preloading the closure device into the open position, allowing a particularly simple construction.

According to one aspect, a casing assembly for a gas turbine engine is provided, which comprises a ventilation device according to any embodiment described herein and a casing having an interior space and at least one air inlet leading to the interior space.

As an option, the casing assembly comprises an air outlet, in particular an annular air outlet. The air outlet is arranged downstream of the at least one air inlet, for example. An annular air outlet makes possible a particularly efficient air flow.

According to one aspect, a gas turbine engine is provided which comprises a ventilation device and/or a casing assembly according to any embodiment described herein.

The gas turbine engine can be, in particular, a gas turbine engine for an aircraft. The gas turbine engine comprises, for example, a core engine, which comprises a turbine, a compressor and a core shaft connecting the turbine to the compressor; a fan, which is positioned upstream of the core engine, wherein the fan comprises a plurality of fan blades; and optionally a transmission, which can be driven by the core shaft, wherein the fan can be driven at a lower speed than the core shaft by means of the transmission.

In the gas turbine engine, the turbine can be a first turbine, the compressor can be a first compressor and the core shaft can be a first core shaft. The core engine may further comprise a second turbine, a second compressor, and a second core shaft connecting the second turbine to the second compressor. The second turbine, the second compressor, and the second core shaft can be arranged so as to be able to rotate at a higher rotational speed than the first core shaft.

As noted elsewhere herein, the present disclosure may relate to a gas turbine engine, e.g. an aircraft engine. Such a gas turbine engine may comprise a core engine comprising a turbine, a combustor, a compressor, and a core shaft connecting the turbine to the compressor. Such a gas turbine engine may comprise a fan (with fan blades) which is positioned upstream of the core engine.

Arrangements of the present disclosure may be particularly, although not exclusively, beneficial for geared fans, which are driven via a transmission. Accordingly, the gas turbine engine may comprise a transmission which is driven via the core shaft and the output of which drives the fan in such a way that it has a lower rotational speed than the core shaft. The input to the transmission may be effected directly from the core shaft, or indirectly via the core shaft, for example via a spur shaft and/or spur gear. The core shaft may be rigidly connected to the turbine and the compressor, such that the turbine and compressor rotate at the same rotational speed (with the fan rotating at a lower rotational speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The core engine may further comprise a second turbine, a second compressor, and a second core shaft connecting the second turbine to the second compressor. The second turbine, second compressor, and second core shaft may be arranged to rotate at a higher speed than the first core shaft.

In such an arrangement, the second compressor may be positioned axially downstream of the first compressor. The second compressor may be arranged to receive (for example directly receive, for example via a generally annular duct) a flow from the first compressor.

The transmission may be designed to be driven by the core shaft that is configured to rotate (for example in use) at the lowest rotational speed (for example the first core shaft in the example above). For example, the transmission may be designed to be driven only by the core shaft that is configured to rotate (for example in use) at the lowest rotational speed (for example only by the first core shaft and not the second core shaft, in the example above). Alternatively, the transmission may be designed to be driven by one or more shafts, for example the first and/or second shaft in the example above.

In a gas turbine engine as described and/or claimed herein, a combustor may be provided axially downstream of the fan and compressor (or compressors). For example, the combustor may be directly downstream of (for example at the exit of) the second compressor, when a second compressor is provided. By way of a further example, the flow at the exit of the compressor may be supplied to the inlet of the second turbine, when a second turbine is provided. The combustor may be provided upstream of the turbine(s).

The or each compressor (for example the first compressor and the second compressor as described above) may comprise any number of stages, for example multiple stages. Each stage may comprise a row of rotor blades and a row of stator blades, which may be variable stator blades (i.e. the angle of incidence may be variable). The row of rotor blades and the row of stator blades may be axially offset with respect to each other.

The or each turbine (for example the first turbine and the second turbine as described above) may comprise any number of stages, for example multiple stages. Each stage may comprise a row of rotor blades and a row of stator blades. The row of rotor blades and the row of stator blades may be axially offset with respect to each other.

Each fan blade may have a radial span extending from a root (or a hub) at a radially inner location which is flowed over by gas, or from a 0% span position, to a tip with a 100% span position. The ratio of the radius of the fan blade at the hub to the radius of the fan blade at the tip may be less than (or on the order of magnitude of) any of the following: 0.4, 0.39, 0.38, 0.37, 0.36, 0.35, 0.34, 0.33, 0.32, 0.31, 0.3, 0.29, 0.28, 0.27, 0.26 or 0.25. The ratio of the radius of the fan blade at the hub to the radius of the fan blade at the tip may be in an inclusive range bounded by two values in the previous sentence (i.e. the values may form upper or lower bounds). These ratios may be referred to in general as the hub-to-tip ratio. The radius at the hub and the radius at the tip may both be measured at the leading edge (or the axially forwardmost edge) of the blade. The hub-to-tip ratio refers, of course, to that portion of the fan blade which is flowed over by gas, i.e. the portion radially outside any platform.

The radius of the fan may be measured between the engine centerline and the tip of the fan blade at its leading edge. The diameter of the fan (which can generally be double the radius of the fan) can be larger than (or on the order of magnitude of): 250 cm (approximately 100 inches), 260 cm, 270 cm (approximately 105 inches), 280 cm (approximately 110 inches), 290 cm (approximately 115 inches), 300 cm (approximately 120 inches), 310 cm, 320 cm (approximately 125 inches), 330 cm (approximately 130 inches), 340 cm (approximately 135 inches), 350 cm, 360 cm (approximately 140 inches), 370 cm (approximately 145 inches), 380 cm (approximately 150 inches), or 390 cm (approximately 155 inches). The fan diameter may be in an inclusive range bounded by any two of the values in the previous sentence (i.e. the values may form upper or lower bounds).

The speed of the fan may vary in operation. Generally, the speed is lower for fans with a larger diameter. Purely by way of a non-limiting example, the rotational speed of the fan under cruise conditions may be less than 2500 rpm, for example less than 2300 rpm. Purely by way of further non-limiting example, the speed of the fan under cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limiting example, the rotational speed of the fan under cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

During the use of the gas turbine engine, the fan (with associated fan blades) rotates about an axis of rotation. This rotation results in the tip of the fan blade moving with a speed Utip. The work done by the fan blades on the flow results in an enthalpy rise dH of the flow. A fan tip loading may be defined as dH/Utip2, where dH is the enthalpy rise (for example the average 1-D enthalpy rise) across the fan and Utip is the (translational) speed of the fan tip, for example at the leading edge of the tip (which may be defined as fan tip radius at the leading edge multiplied by angular speed). The fan tip loading at cruise conditions may be more than (or on the order of magnitude of): 0.3, 0.31, 0.32, 0.33, 0.34, 0.35, 0.36, 0.37, 0.38, 0.39, or 0.4 (wherein all units in this passage are Jkg−1K−1/(ms−1)2). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core under cruise conditions. In the case of some arrangements, the bypass ratio can be more than (or on the order of magnitude of): 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). As a non-limiting example, the overall pressure ratio of a gas turbine engine as described and/or claimed herein at cruising speed may be greater than (or on the order of): 35, 40, 45, 50, 55, 60, 65, 70, 75. The overall pressure ratio may be in an inclusive range bounded by any two of the values in the previous sentence (i.e. the values may form upper or lower bounds).

The specific thrust of an engine can be defined as the net thrust of the engine divided by the total mass flow through the engine. The specific thrust of an engine as described and/or claimed herein at cruise conditions may be less than (or on the order of): 110 Nkg-1s, 105 Nkg-1s, 100 Nkg-1s, 95 Nkg-1s, 90 Nkg-1s, 85 Nkg-1s or 80 Nkg-1s. The specific thrust may be in an inclusive range bounded by any two of the values in the previous sentence (i.e. the values may form upper or lower bounds). Such engines can be particularly efficient in comparison with conventional gas turbine engines.

A gas turbine engine as described and/or claimed herein may have any desired maximum thrust. Purely by way of non-limiting example, a gas turbine as described and/or claimed herein can be capable of generating a maximum thrust of at least (or on the order of): 160 kN, 170 kN, 180 kN, 190 kN, 200 kN, 250 kN, 300 kN, 350 kN, 400 kN, 450 kN, 500 kN or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15° C. (ambient pressure 101.3 kPa, temperature 30° C.), with the engine static.

In use, the temperature of the flow at the entry to the high-pressure turbine can be particularly high. This temperature, which may be referred to as TET, may be measured at the exit to the combustor, for example immediately upstream of the first turbine blade, which itself may be referred to as a nozzle guide blade. At cruising speed, the TET may be at least (or on the order of): 1400 K, 1450 K, 1500 K, 1550 K, 1600 K or 1650 K. The TET at cruise may be in an inclusive range bounded by any two of the values in the previous sentence (i.e. the values may form upper or lower bounds). The maximum TET in the use of the engine may be at least (or on the order of), for example: 1700 K, 1750 K, 1800 K, 1850 K, 1900 K, 1950 K or 2000 K. The maximum TET may be in an inclusive range bounded by any two of the values in the previous sentence (i.e. the values may form upper or lower bounds). The maximum TET may occur, for example, under a high thrust condition, for example under a maximum take-off thrust (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fiber. By way of a further example at least a part of the fan blade and/or aerofoil may be manufactured at least in part from a metal, such as a titanium based metal or an aluminum based material (such as an aluminum-lithium alloy) or a steel based material. The fan blade may comprise at least two regions manufactured using different materials. For example, the fan blade may have a protective leading edge, which is manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fiber or aluminum based body (such as an aluminum-lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage with a corresponding slot in the hub (or disk). Purely by way of example, such a fixture may be in the form of a dovetail that may slot into and/or be brought into engagement with a corresponding slot in the hub/disk in order to fix the fan blade to the hub/disk. By way of a further example, the fan blades may be formed integrally with a central portion. Such an arrangement can be referred to as a blisk or a bling. Any suitable method may be used to manufacture such a blisk or such a bling. For example, at least a part of the fan blades may be machined from a block and/or at least part of the fan blades may be attached to the hub/disk by welding, such as linear friction welding.

The gas turbine engines described and/or claimed herein may or may not be provided with a variable area nozzle (VAN). Such a variable area nozzle may allow the exit area of the bypass duct to be varied in operation. The general principles of the present disclosure can apply to engines with or without a VAN.

The fan of a gas turbine as described and/or claimed herein may have any desired number of fan blades, for example 16, 18, 20, or 22 fan blades.

As used herein, cruise conditions may mean the cruise conditions of an aircraft to which the gas turbine engine is attached. Such cruise conditions may be conventionally defined as the conditions during the middle part of the flight, for example the conditions experienced by the aircraft and/or the engine between (in terms of time and/or distance) the end of the ascent and the start of the descent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any speed within these ranges may be the cruise condition. In the case of some aircraft, the cruise conditions may be outside these ranges, for example below Mach 0.7 or above Mach 0.9.

Purely by way of example, the cruise conditions may correspond to standard atmospheric conditions at an altitude that is in the range of from 10000m to 15000m, for example in the range of from 10000m to 12000m, for example in the range of from 10400m to 11600m (around 38000 ft), for example in the range of from 10500m to 11500m, for example in the range of from 10600m to 11400m, for example in the range of from 10700m (around 35000 ft) to 11300m, for example in the range of from 10800m to 11200m, for example in the range of from 10900m to 11100m, for example on the order of magnitude of 11000m. The cruise conditions may correspond to standard atmospheric conditions at any given altitude in these ranges.

Purely by way of example, the cruise conditions may correspond to the following: a forward Mach number of 0.8, a pressure of 23000 Pa and a temperature of −55° C.

As used anywhere herein, "cruise" or "cruise conditions" can mean the aerodynamic design point. Such an aerodynamic design point (or ADP) may correspond to the conditions (comprising, for example, the Mach Number, environmental conditions and thrust demand) for which the fan is designed to operate. This may mean, for example, the conditions at which the fan (or gas turbine engine) is designed to have optimum efficiency.

During operation, a gas turbine engine described and/or claimed herein may be operated under the cruise conditions defined elsewhere herein. Such cruise conditions may be determined by the cruise conditions (for example the conditions during the middle part of the flight) of an aircraft on which at least one (for example two or four) gas turbine engine(s) may be mounted in order to provide propulsive thrust.

It is self-evident to a person skilled in the art that a feature or parameter described in relation to any one of the above aspects may be applied to any other aspect, unless they are mutually exclusive. Furthermore, any feature or any parameter described here may be applied to any aspect and/or combined with any other feature or parameter described here, unless they are mutually exclusive.

Embodiments will now be described by way of example with reference to the figures, in which.

Figure 1:
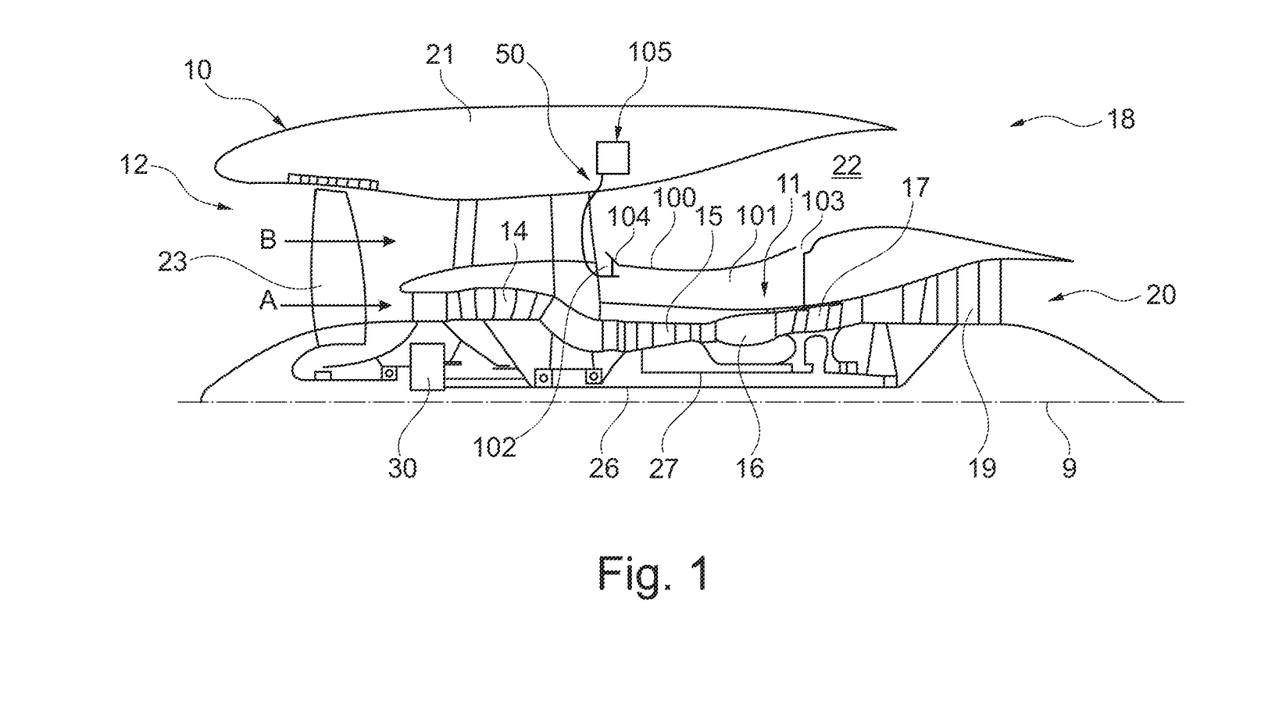
FIG. 1 shows a sectional side view of a gas turbine engine.

FIG. 1 illustrates a gas turbine engine 10 having a main axis of rotation 9. The gas turbine engine 10 comprises an air inlet 12 and a fan 23 that generates two air flows: a core air flow A and a bypass air flow B. The gas turbine engine 10 comprises a core in the form of a core engine 11 that receives the core air flow A. When viewed in the order corresponding to the axial direction of flow, the core engine 11 comprises a low-pressure compressor 14, a high-pressure compressor 15, a combustion device 16, a high-pressure turbine 17, a low-pressure turbine 19, and a core thrust nozzle 20. An engine nacelle 21 surrounds the gas turbine engine 10 and defines a bypass duct 22 and a bypass thrust nozzle 18. The bypass air flow B flows through the bypass duct 22. The fan 23 is attached to and driven by the low-pressure turbine 19 via a shaft 26 and an epicyclic planetary transmission 30.

During operation, the core air flow A is accelerated and compressed by the low-pressure compressor 14 and directed into the high-pressure compressor 15, where further compression takes place. The compressed air expelled from the high-pressure compressor 15 is directed into the combustion device 16, where it is mixed with fuel and the mixture is combusted. The resultant hot combustion products then expand through, and thereby drive, the high-pressure and low-pressure turbines 17, 19 before being exhausted through the nozzle 20 to provide some propulsive thrust. The high-pressure turbine 17 drives the high-pressure compressor 15 by means of a suitable connection shaft 27. The fan 23 generally provides the major part of the propulsive thrust. The epicyclic planetary transmission 30 is a reduction transmission.

Note that the terms "low-pressure turbine" and "low-pressure compressor" as used herein may be taken to mean the lowest-pressure turbine stage and lowest-pressure compressor stage (i.e. not including the fan 23) respectively and/or the turbine and compressor stages that are connected together by the connecting shaft 26 with the lowest rotational speed in the engine (i.e. not including the transmission output shaft that drives the fan 23). In some literature, the "low-pressure turbine" and "low-pressure compressor" referred to herein may alternatively be known as the "intermediate-pressure turbine" and "intermediate-pressure compressor". Where such alternative nomenclature is used, the fan 23 can be referred to as a first, or lowest-pressure, compression stage.

Of course, the present disclosure extends to a gas turbine engine having any arrangement of types of transmission (for example star or epicyclic-planetary), supporting structures, input and output shaft arrangement, and bearing locations.

Optionally, the transmission may drive additional and/or alternative components (e.g. the intermediate-pressure compressor and/or a booster compressor).

Other gas turbine engines to which the present disclosure can be applied may have alternative configurations. For example, engines of this type may have an alternative number of compressors and/or turbines and/or an alternative number of connecting shafts. By way of a further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core engine 11 are mixed, or combined, before (or upstream of) a single nozzle, which can be referred to as a mixed-flow nozzle. One or both nozzles (whether mixed or split flow) may have a fixed or variable area. Whilst the described example relates to a turbofan engine, the disclosure may be applied, for example, to any type of gas turbine engine, such as an open-rotor (in which the fan stage is not surrounded by a nacelle) or turboprop engine, for example.

The geometry of the gas turbine engine 10, and components thereof, is/are defined by a conventional axis system, comprising an axial direction (which is aligned with the rotation axis 9), a radial direction (in the bottom-to-top direction in FIG. 1), and a circumferential direction (perpendicular to the view in FIG. 1). The axial, radial and circumferential directions run so as to be mutually perpendicular.

According to FIG. 1, the gas turbine engine 10 furthermore comprises a ventilation device 50 for controlling an air flow through at least one air inlet 102 into an interior space 101 of the gas turbine engine 10. The interior space 101 is defined and/or surrounded by a casing 100. The casing 100 surrounds the core engine 11 of the gas turbine engine 10. In the example shown, an outer surface of the casing 100 defines an inner boundary of the bypass duct 22.

In the present case, the interior space 101 is of annular design and surrounds parts of the core engine 11, in particular at least one section of the combustion device 16. During the operation of the gas turbine engine 10, parts of the core engine 11, in particular the combustion device 16, heat up. By means of the ventilation device 50, the interior space 101 can be ventilated in order to dissipate heat. Functional components of the gas turbine engine 10 can be arranged in the interior space 101 and can be cooled as a result. Moreover, unburnt combustible vapors could accumulate in the interior space, and these can likewise be carried away by the ventilation.

The air inlet 102 connects the interior space 101 to the bypass duct 22, thus enabling relatively cold air from the bypass duct 22 to flow into the interior space 101. In the present case, the ventilation device 50 comprises a plurality of air inlets 102, which can be arranged on the casing 100 so as to run around the main axis of rotation 9, for example.

An air outlet 103 allows air and vapors to flow out of the interior space 101. The air outlet 103 is arranged downstream of the air inlet 102. In the present case, the air outlet 103 connects the interior space 101 to the bypass duct 22. In the example shown, the air outlet 103 is of annular design. In the present case, the air outlet 103 extends in a ring around the core engine 11. In this way, air can flow out in a particularly efficient way. The air inlet 102 and the air outlet 103 are arranged at opposite ends of the interior space 101 in relation to the main axis of rotation 9.

The ventilation device 50 furthermore comprises a fire extinguishing device 105, and can thus also be referred to as a ventilation and extinguishing device. The fire extinguishing device 105 comprises at least one reservoir with extinguishing agent arranged therein in the form of a fluid. In the event that a fire breaks out in the interior space 101, the fire extinguishing device 105 can be activated, with the result that extinguishing agent is directed out of the reservoir into the interior space 101 in order to extinguish the fire. To extinguish fire in an effective manner, as high a concentration as possible of extinguishing agent in the interior space 101 is desirable.

In order to be able to build up as high as possible a concentration of extinguishing agent in the interior space 101 with as small a quantity as possible of extinguishing agent, the ventilation device 50 comprises at least one actuable closure device 104 for the at least one air inlet 102, which has an open position for exposing the air inlet 102 and can be transferred by actuation into a closed position for closing the air inlet 102.

In this arrangement, the fire extinguishing device 105 is connected or can be connected to the interior space 101 and the closure device 104 in such a way that activation of the fire extinguishing device 105 both leads to admission of extinguishing agent from the reservoir into the interior space 101 and brings about actuation of the closure device 104 for transfer thereof into the closed position.

This functionality is explained in greater detail below with reference to FIGS. 2 and 3.

Figure 2:
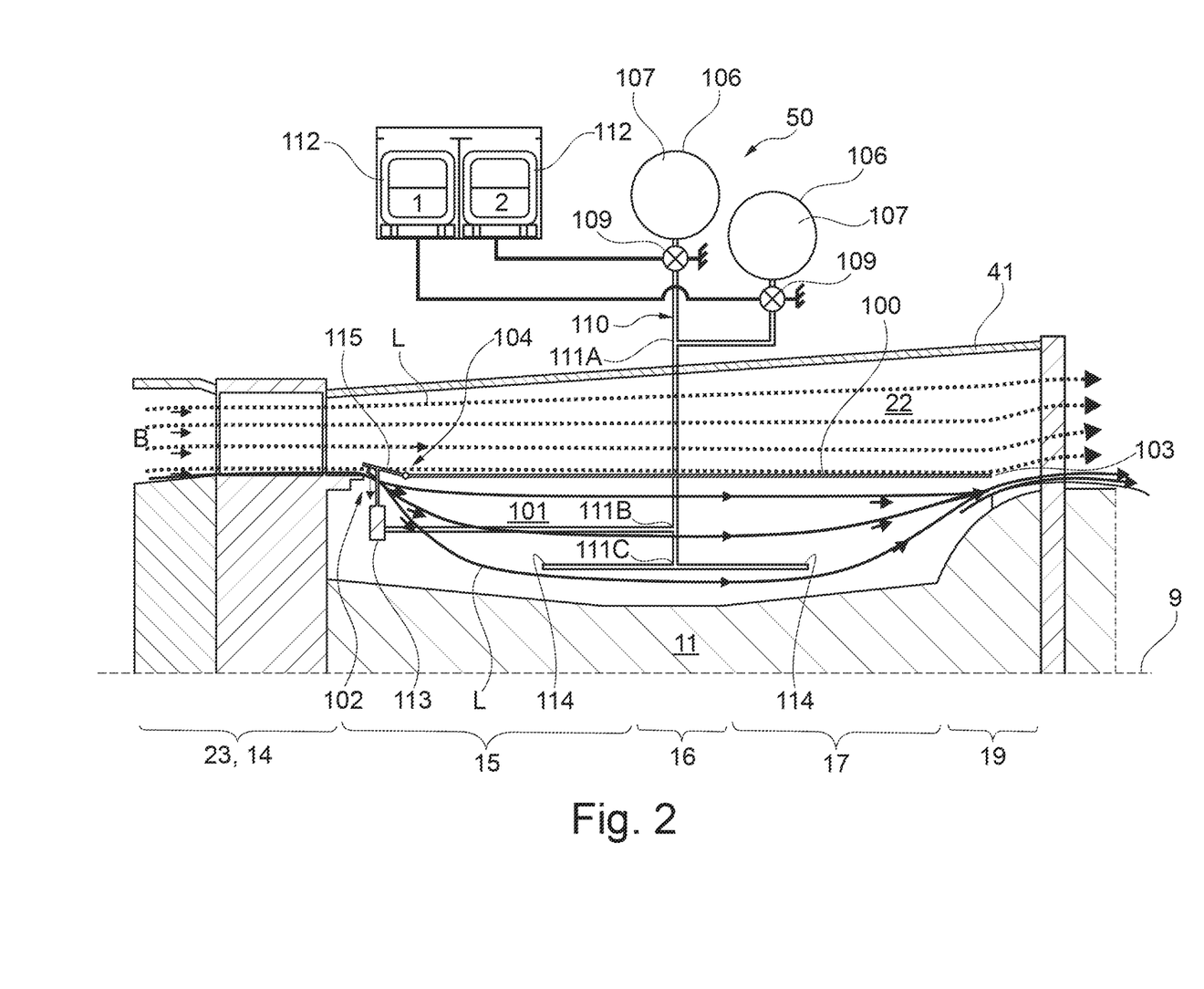
FIG. 2 shows a sectional side view of one section of the gas turbine engine shown in FIG. 1 with a ventilation device, wherein a closure device of the ventilation device is shown in an open position.
Figure 3:
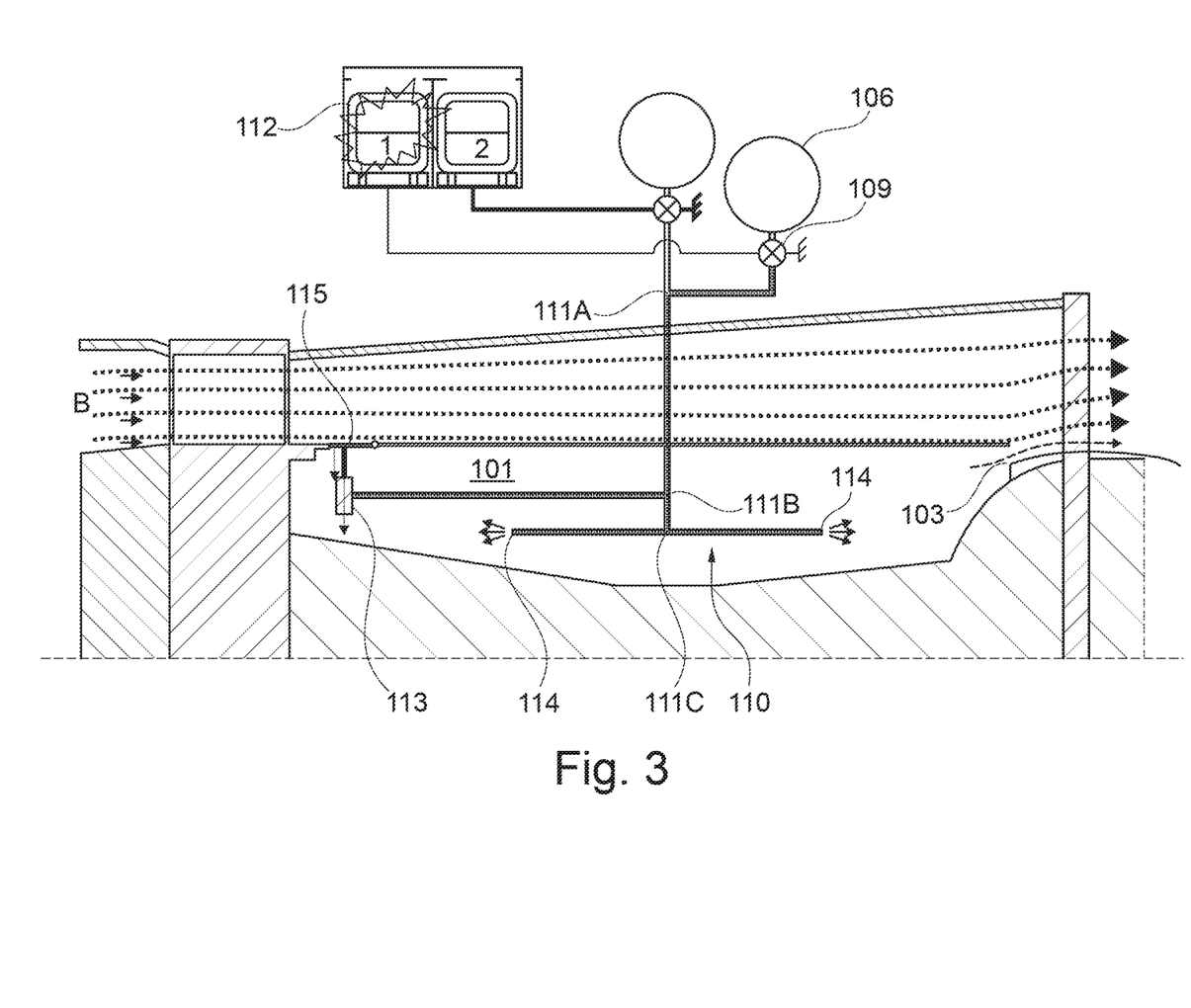
FIG. 3 shows a view corresponding to FIG. 2, wherein the closure device of the ventilation device is shown in a closed position.

FIG. 2 shows a section of the gas turbine engine 10 in a cross-sectional view as well as the ventilation device 50. Components 14-17, 19, 23 of the gas turbine engine 10, in particular of the core engine 11 thereof, are indicated in a purely schematic way in respect of their approximate position.

FIG. 2 shows the closure device 104 of the ventilation device 50 in an open state. A closure element that can be moved relative to the casing 100, in this case in the form of a flap 115, exposes the air inlet 102 in the open state, thus enabling an air flow L to flow into the interior space 101 from the bypass duct 22 and to flow back out through the air outlet 103. In this case, the air flow L carries heat out of the interior space 101.

In the example shown, the flap 115 is mounted pivotably on the casing 100. Here, the opened flap 115 is aligned in such a way that it guides part of the bypass air flow B as air flow L into the interior space 101. In the example shown in FIG. 2, a pivoted joint of the flap 115 to the casing 100 is arranged downstream of an end of the flap 115 remote from the pivoted joint.

The position of the flap 115 (and in general of the closure element) is controlled by an actuator 113. In the present case, the actuator 113 is arranged in the interior space 101, although other arrangements are also conceivable. The closure element has an open position and a position which is, for example, fully closed.

The ventilation device 50 comprises at least one reservoir 106, in the example shown two reservoirs 106, in the present case in each case in the form of a cylinder, in particular in the form of a gas cylinder. The reservoirs 106 are connected via a line arrangement 110 to the interior space 101 and to the actuator 113. The line arrangement 110 comprises pipes and/or hoses.

A respective section of the line arrangement 110 connects each of the reservoirs 106 to a (first) branch 111A. At the branch 111A, the two sections are combined. A (common) pipe and/or hose section of the line arrangement 110 extends (from this branch 111A) into the interior space 101 of the casing 100. In the interior space 101 of the casing 100, the line arrangement 110 has a second branch 111B, from which there starts a first section, which connects the second branch 111B to the actuator 113. A second section starting from the second branch 111B opens via at least one outlet opening 114 into the interior space 101, in the example shown via two outlet openings 114, which are connected via a third branch 111C to the remainder of the line arrangement 110, in this case specifically to the second branch 111B. Of course, the line arrangement 110 can also have further branches and/or outlet openings 114, which, in particular, can be arranged offset relative to one another in the circumferential direction around the main axis of rotation 9. As an option, a nozzle is arranged at the at least one (in particular at each) outlet opening 114.

The reservoirs 106 are each connected by a valve 109 to the line arrangement 110. If one of the valves 109 is opened, extinguishing agent 107 flows out of the respective reservoir 106 through the line arrangement 110 and the outlet openings 114 into the interior space 101 and, at the same time, to the actuator 113. As a result, extinguishing agent 107 is released in the interior space 101, in particular in order to extinguish a fire in the interior space 101.

In each reservoir 106, the extinguishing agent 107 is under pressure (e.g. of over 500 psi, e.g. of about 600 psi), with the result that opening the respective valve 109 subjects the actuator 113 to a pressure by means of the extinguishing agent 107. The closure device 104 is thereby transferred into the closed position. More specifically, the flap 115 is moved, namely pivoted, in such a way relative to the casing 100, that it closes the air inlet 102, see especially FIG. 3.

Activation of the fire extinguishing device 105 is accomplished by opening at least one of the valves 109. The valves 109 are electrically controllable. The actuation of the associated switch 112 operates the respective valve 109, with the result that it opens. More specifically, the actuation of a switch 112 closes a circuit, with the result that a control current flows and controls the corresponding valve 109.

For each reservoir 106, the ventilation device 50 comprises an associated switch 112. FIG. 3 shows the case of actuation of one of the two switches 112. The associated valve 109 (the valve 109 illustrated on the right in FIG. 3) then opens in such a way that the extinguishing agent 107 stored in the reservoir 106 connected thereto or a part thereof flows into the interior space 101 of the casing 100 and, in the process, brings about actuation of the closure device 104 for transfer into the closed position. If the fire should then break out again, the second switch 112 can be actuated. As an alternative, both switches 112 can be actuated at the same time in the case of a severe fire.

Figure 4:
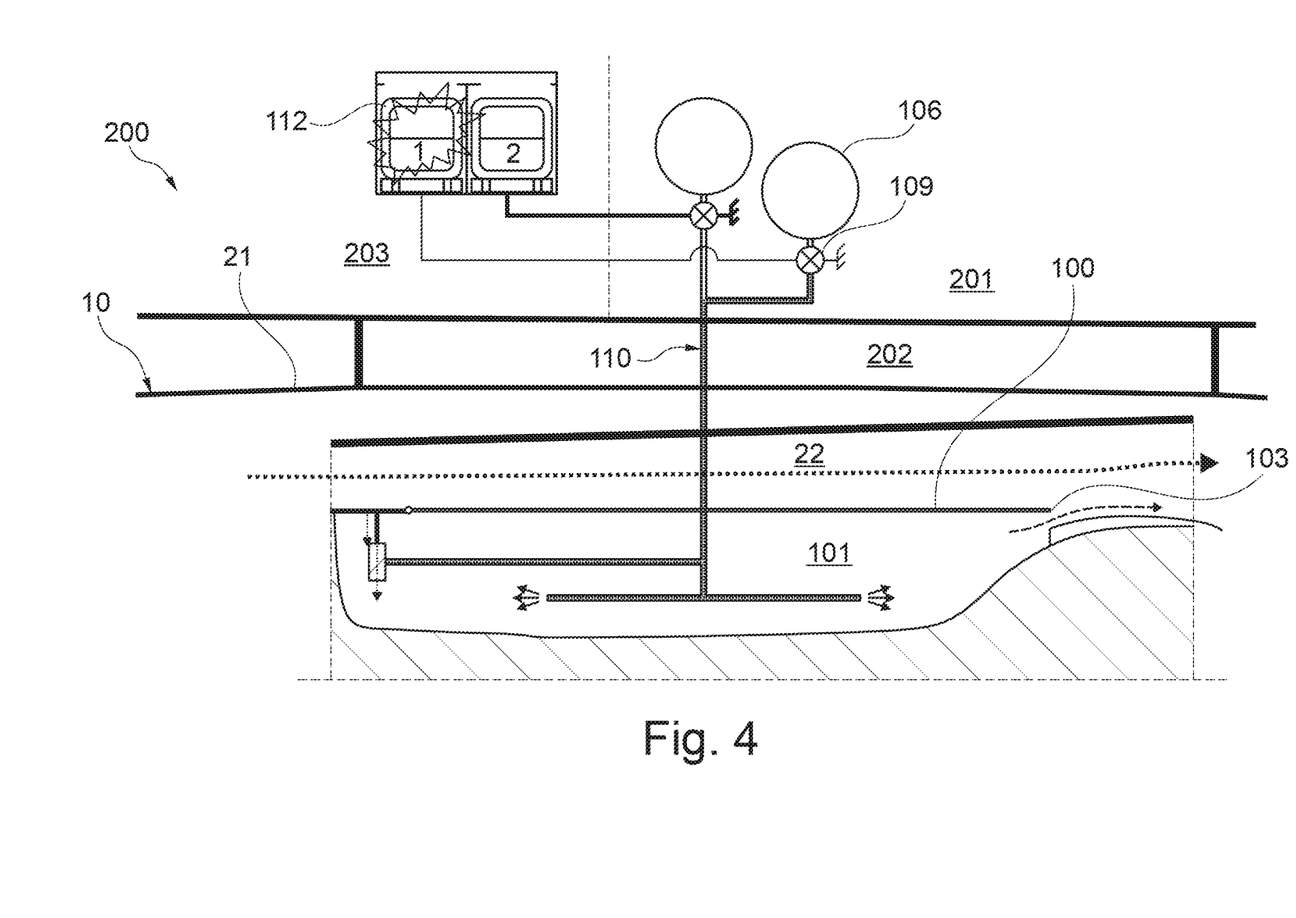
FIG. 4 shows a view of part of an aircraft having the gas turbine engine shown in FIG. 1.

FIG. 4 shows a possible arrangement of individual components of the ventilation device 50 on an aircraft 200, of which here a section of the fuselage, of a pylon 202 and of the gas turbine engine 10 are illustrated in each case. The pylon 202 connects the gas turbine engine 10 to the fuselage of the aircraft 200. The reservoirs 106 are arranged in the fuselage of the aircraft 200, more specifically in a rear region 201 in the example shown. The aircraft 200 comprises a cockpit 203, wherein the switches 112 are arranged in the cockpit. Cables connect the switches 112 to the valves 109, wherein wireless transmission of signals is also conceivable. The line arrangement 110 comprises a line section which extends through the pylon 202 in order to direct extinguishing agent 107 to the interior space 101 of the casing 100.

The region of the interior space 101 is often referred to as zone 2 or fire extinguishing zone 2. In this zone 2, a minimum air exchange of 5 times the volume of the interior space 101 per minute is generally prescribed. With the ventilation device 50, it is possible to achieve even higher values and, at the same time, to provide particularly effective fire extinguishing with a low weight.

The extinguishing agent 107 is optionally not halon.

Figure 5:
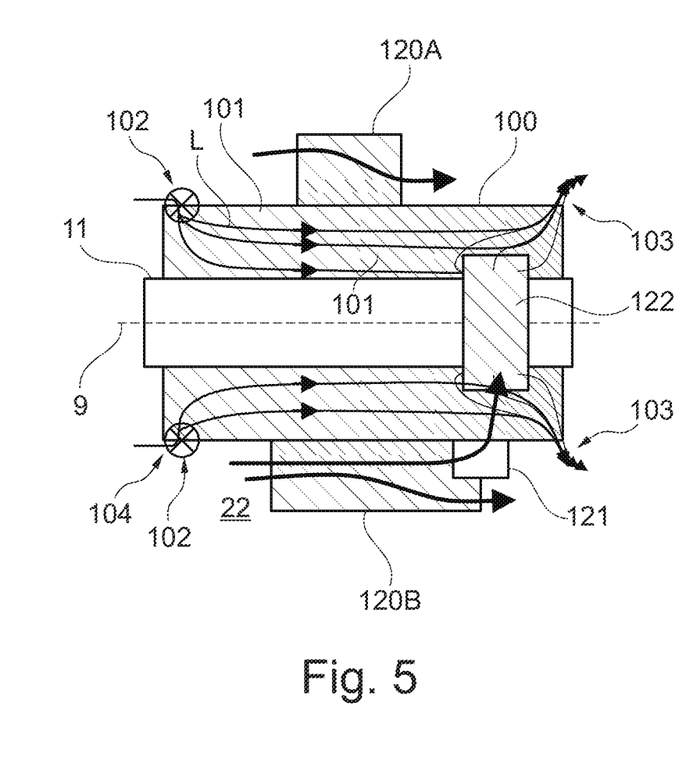
FIG. 5 shows a view of a casing of the gas turbine engine.

FIG. 5 shows further, optional details of the casing 100 of the gas turbine engine 10. An upper splitter 120A directs air onto the casing 100 in order to cool it. A lower splitter 120B removes an air flow from the bypass duct 22 and directs this by means of a cooling air scoop 121 ("turbine case cooling scoop") into the interior space of the casing 100. Via the cooling air scoop 121, air is directed to a manifold 122 ("turbine case cooling manifold"). The manifold 122 is arranged on the engine core 11. More specifically, the manifold 11 surrounds the engine core 11 in a location adjacent to the combustion device 16. The engine core 11 can be cooled by means of the cooling air scoop 121 and the manifold 122. The heated cooling air flows through the air outlet 103 of the casing 100 (through which the air flows L stemming from the air inlets 102 also flow out).

Thus, the cooling air does not have to flow out via one of the splitters 120A, 120B but can be discharged through the air outlet 103 in a simple and effective manner.

While FIG. 5 shows two air inlets 102 of the casing 100, a larger number of air inlets is also conceivable. The closure device 104 is illustrated only in a purely schematic way in FIG. 5.

Analyses have shown that the air inlets 102 and the air outlet 103 can be enlarged in such a way by means of the ventilation device 50 that reduced temperatures of around 80° C. are possible during operation in the central regions of the core engine 11.

Figure 6:
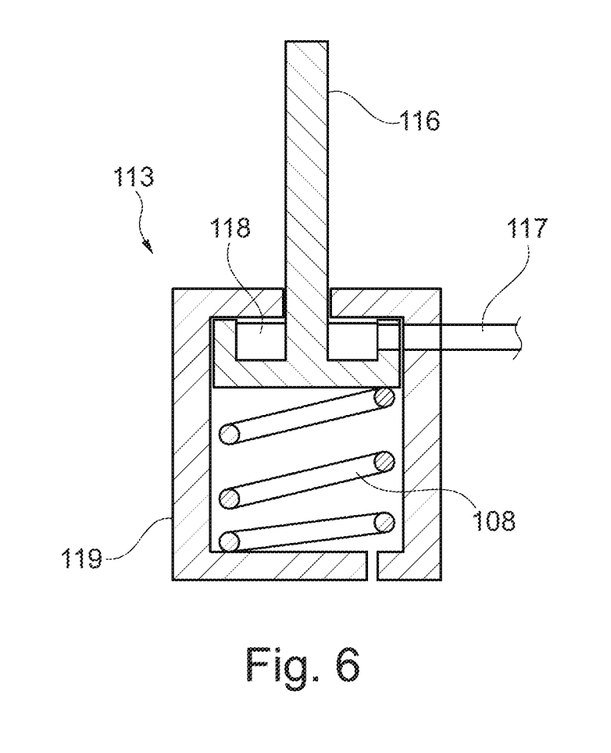
FIG. 6 shows an actuator of the ventilation device shown in FIGS. 2 and 3.

FIG. 6 shows one possible embodiment of the actuator 113. The actuator 113 comprises a cylinder 119, on which a plunger 116 is movably mounted. The plunger 116 comprises a piston in the interior space of the cylinder 119, which, together with the cylinder 119, forms a pressure chamber 118. A connection line 117 of the line arrangement 110 is connected to the pressure chamber. A spring 108 presses the piston against a wall of the cylinder 119, with the result that the plunger 116 is extended. The closure device 104 is thereby preloaded into the open position if the fire extinguishing device 105 is not activated.

By means of activation of the fire extinguishing device 105, in the example shown by actuation of at least one of the switches 112, the line arrangement 110 is put under pressure by extinguishing agent 107, as is thus also the pressure chamber 118 via the connection line 117. The plunger 116 is thereby pushed into the cylinder 119 against the force of the spring 108. Since the plunger 116 is coupled to the flap 115, e.g. attached pivotably thereto at one end, the flap 115 is moved into a position in which it closes the air inlet 102.

If the closure device 104 adopts the closed position, no fresh air flows through the air inlet 102, and therefore a relatively high concentration of extinguishing agent can be achieved rapidly in the volume of the interior space 101. Excess air and extinguishing agent from the interior space 101 can furthermore flow out through the air outlet 103. The air outlet 103 is continuously open.

Since the closure device 104 is actuated by the fire extinguishing device 105, no further control fluid or the like is necessary, which minimizes the number of potential sources of faults. It is also possible in this way to ensure that, at the same time or substantially at the same time, both the closure device 104 is transferred into the closed position and extinguishing agent 107 is introduced into the interior space 101, thus making it possible to dispense with further reaching and consequently expensive measures for ensuring suitable timing. It is also possible to ensure that the air inlet 102 or the air inlets 102 can also be opened directly with the ending of the introduction of extinguishing agent 107, thus ensuring that cooling is rapidly resumed and does not have to be separately activated.

It will be understood that the invention is not limited to the embodiments above-described, and various modifications and improvements may be made without departing from the concepts described herein. Except where mutually exclusive, any of the features can be employed separately or in combination with any other features, and the disclosure extends to and includes all combinations and sub-combinations of one or more features that are described herein.

In particular, the use of the ventilation device 50 is not restricted to zone 2 of the gas turbine engine. For example, use is likewise possible in relation to an interior space of "zone 1", which is arranged outside the bypass duct 22 in the engine nacelle 21, and/or in relation to an interior space of the pylon 202.

LIST OF REFERENCE SIGNS

9 Main axis of rotation
10 Gas turbine engine
11 Core engine
12 Air intake
14 Low-pressure compressor
15 High-pressure compressor
16 Combustion installation
17 High-pressure turbine
18 Bypass thrust nozzle
19 Low-pressure turbine
20 Core thrust nozzle
21 Engine nacelle
22 Bypass duct
23 Fan
26 Shaft
27 Connecting shaft
30 Transmission
50 Ventilation device
100 Casing
101 Interior space
102 Air inlet
103 Air outlet
104 Closure device
105 Fire extinguishing device
106 Reservoir
107 Extinguishing agent
108 Spring
109 Valve
110 Line arrangement
111A-111C Branch
112 Switch
113 Actuator
114 Outlet opening
115 Flap
116 Plunger
117 Connection line
118 Pressure chamber
119 Cylinder
120A, 120B Splitter
121 Cooling air scoop
122 Manifold
200 Aircraft
201 Rear region
202 Pylon
203 Cockpit
A Core air flow
B Bypass air flow
L Air flow

The invention claimed is:

1. A ventilation device for controlling an air flow through an air inlet into an interior space of a gas turbine engine, comprising:
an actuatable closure device for the one air inlet, which has an open position for exposing the air inlet and is movable by actuation into a closed position for closing the air inlet;
a fire extinguishing device having an extinguishing agent arranged in a reservoir,
a line arrangement providing a fluid connection between the reservoir and the interior space and the closure device;
wherein the fire extinguishing device is configured in such a way that activation of the fire extinguishing device both leads to admission of extinguishing agent from the reservoir, through the line arrangement, and into the interior space and causes actuation of the closure device to transfer the closure device into the closed position.

2. The ventilation device as claimed in claim 1, wherein the fire extinguishing device comprises a valve which controls discharge of the extinguishing agent from the reservoir, wherein the valve is controllable by a control signal.

3. The ventilation device as claimed in claim 1, wherein the extinguishing agent is a fluid.

4. The ventilation device as claimed in claim 1, wherein the line arrangement comprises a branch.

5. The ventilation device as claimed in claim 1, and further comprising an actuator, which is connected to the line arrangement and is operatively connected to the closure device, wherein the actuator is configured to actuate the closure device for transfer into the closed position as a result of being supplied with the extinguishing agent from the reservoir.

6. The ventilation device as claimed in claim 1, wherein the closure device is preloaded into the open position.

7. The ventilation device as claimed in claim 6, and further comprising a spring for preloading the closure device into the open position.

8. A casing assembly for a gas turbine engine, comprising a casing comprising the interior space, the air inlet and the ventilation device as claimed in claim 1.

9. The casing assembly as claimed in claim 8, and further comprising an annular air outlet downstream of the air inlet.

10. A gas turbine engine having the casing assembly as claimed in claim 8.

11. The gas turbine engine as claimed in claim 10, for an aircraft, comprising:
a core engine comprising a turbine, a compressor, and a core shaft connecting the turbine to the compressor;
a fan, which is positioned upstream of the core engine, wherein the fan comprises a plurality of fan blades; and
a transmission, driven by the core shaft, wherein the fan is driven by the transmission at a lower rotational speed than the core shaft.

12. The gas turbine engine as claimed in claim 11, wherein:
the turbine is a first turbine, the compressor is a first compressor, and the core shaft is a first core shaft;
the core engine further comprises a second turbine, a second compressor, and a second core shaft which connects the second turbine to the second compressor; and
the second turbine, second compressor, and second core shaft are arranged to rotate at a higher speed than the first core shaft.

* * * * *